Sept. 12, 1950   J. R. SCHAFFER   2,522,137
RUBBER-TO-METAL ADHESION
Filed Sept. 11, 1945

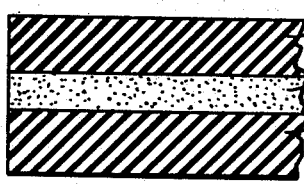

Rubber (Natural and/or Synthetic.)
Partially Dechlorinated Chlorinated Rubber and partially Halogenated Rubber.
Rubber (Natural and/or Snythetic.)

Fig-1

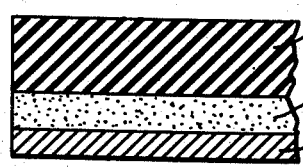

Rubber (Natural and/or Synthetic.)
Partially Dechlorinated Chlorinated Rubber, partially Halogenated Rubber, and if desired, A Crude Rubber.
Rigid Base member such as Steel.

Fig-2

Inventor
James R. Schaffer
By Robert W. Furlong
Atty.

Patented Sept. 12, 1950

2,522,137

UNITED STATES PATENT OFFICE 2,522,137

RUBBER-TO-METAL ADHESION

James R. Schaffer, Akron, Ohio, assignor to The B. F. Goodrich Company, New York, N. Y., a corporation of New York Application September 11, 1945, Serial No. 615,705

17 Claims. (Cl. 154—130)

This invention relates to adhesion of rubber and the like to metallic and similar surfaces and particularly to an adhesive cement for that purpose.

An object of this invention is to provide a method of adhering rubber and the like to metallic and similar surfaces which will provide superior and more reliable rubber to metal adhesion.

A further object of the invention is to provide a method of rubber to metal adhesion which will firmly and tenaciously adhere a variety of different kinds of rubberlike materials to metal.

I have discovered a method of adhering rubber and the like to metallic and the like surfaces involving the use of a new adhesive cement. The adhesive cement of my invention comprises a solution in a volatile solvent of a partially decomposed chlorinated rubber, a partially chlorinated rubber and preferably a small proportion of a crude rubber as well as minor proportions of compounding ingredients such as carbon black, organic age-resisting agents and others known to the art. The adhesive cement of my invention is brushed, sprayed or smeared in any manner upon a clean surface (preferably freshly sand-blasted) and allowed to dry to a tacky condition before applying thereover a layer of a vulcanizable rubber composition and vulcanizing the assembly under pressure.

I have also discovered that many of the synthetic rubberlike materials, particularly those of the isoprene or butadiene types, will produce derivatives which may be substituted in the adhesive of this invention for the partially decomposed chlorinated rubber and for the partially chlorinated rubber with much the same results. The natural rubber derivatives are to be preferred for most applications of rubber to metal adhesion but in specific instances, particularly the adhesion of synthetic rubbers to steel, adhesive cements containing the corresponding synthetic derivatives will be found to give equivalent or even slightly better adhesion to metal and similar surfaces.

The partially decomposed chlorinated rubbers used in the invention (Component A herein) may be any of the derivatives produced when fully chlorinated rubber containing 65% or more chlorine is partially decomposed or dechlorinated as by passing gaseous ammonia into a solution of the chlorinated rubber until a small proportion of chlorine has been removed. This partial decomposition may be accomplished in a number of other ways, for example, by treating a solution of the fully chlorinated rubber with zinc dust or simply by heating the solution of the chlorinated rubber. Equally good results have been obtained by milling the solid fully chlorinated rubber on a heated rubber mill for a time sufficient to bring about the desired partial decomposition. Still other methods of producing the partially decomposed chlorinated rubbers are possible.

The chlorinated rubbers used in the invention to prepare the partially decomposed chlorinated rubber derivatives may be any of the derivatives of natural rubber containing 65% or more chlorine prepared by any of the known methods such as the derivative formed by passing gaseous chlorine into a dilute solution of rubber. Commercially available chlorinated rubbers are marketed as "Tornesite" by the Hercules Powder Company and are the preferred type of raw materials for use in the manufacture of the partially decomposed chlorinated rubber derivatives of this invention. Fully chlorinated derivatives of such synthetic rubberlike materials as neoprene (polychloroprene) polybutadiene, polyisoprene, the butadiene-1,3-styrene polymers and the like may also be used to prepare the partially decomposed derivatives of this invention.

The partially chlorinated rubbers (Component B herein) used in the invention are the products formed in any manner known to the art as by passing gaseous chlorine into a dilute solution of rubber or by reacting liquid chlorine with rubber under pressure. If the chlorination reaction is carried to completion or saturation, a rubber derivative is obtained having a chlorine content of about 65–67%. Such a derivative is hard and resin-like, while the partially chlorinated rubber derivative of the present invention is a chlorinated derivative obtained by stopping the chlorination reaction in its early stages and while the derivative still retains some of its rubberlike properties.

The adhesive cement of this invention may be made by adding the rubber derivatives, the crude rubber, and the desired compounding ingredients to a sufficient quantity of a volatile solvent to make a solution of the proper consistency for application by brushing, spraying or spreading.

In the practice of the invention, one or more coatings of the adhesive cement may be applied to the metallic surface and allowed to dry before placing the rubber layer in contact therewith. If it is desired, the rubber layer may also be given a coating of the cement and the cement coated metallic surface and rubber layer brought into contact. The assembled layers are then subjected to heat and pressure for a time sufficient to effect a bond. The conditions of temperature and pressure necessary to vulcanize the rubber layer are sufficient for bonding the metal and rubber layers together.

The invention will be more easily understood by reference to the accompanying drawing. Fig. 1 represents an illustrative manner of adhering one layer of rubber, which may be either natural or synthetic to a second layer of rubber, either natural or synthetic, by interposing a layer or coating of adhesive comprising a partially dechlorinated rubber chloride and a partially halogenated rubber and vulcanizing the assembly under heat and pressure. Fig. 2 shows a layer of rubber, which may be either natural or synthetic in nature, adhered to a rigid base member such as steel by means of an adhesive comprising a partially dechlorinated rubber chloride, a partially halogenated rubber, and if desired, a crude rubber. The relative thicknesses of the rubber layers, their composition and disposition shown in the drawing are intended to be illustrative only and are not to be construed as a limitation on the invention.

The invention will now be described with reference to certain specific examples.

EXAMPLE I

Component A

This component, a partially decomposed chlorinated natural rubber, was prepared as follows:

500 grams of chlorinated rubber (65% chlorine) were dissolved in 2500 g. (2850 c. c.) of benzene. Anhydrous ammonia in gaseous form was passed into this solution for approximately 4 hours at a temperature of 25° centigrade. This solution was then heated to about 75–80° C. to expel excess ammonia. The reaction product was precipitated by pouring the reaction mixture into an excess of alcohol. Upon analysis the product was found to contain approximately 59% of chlorine.

Component B

Component B of this example was a partially chlorinated natural rubber and was prepared as follows:

A solution consisting of 4.8 grams of sulfuryl chloride and 0.2 gram of benzoyl peroxide dissolved in 100 grams of carbon tetrachloride was added with stirring and refluxing to 200 grams of a 6% solution of pale crepe rubber in carbon tetrachloride, the reaction vessel being covered to give almost complete darkness. Analysis of a portion of the product revealed that it contained 10.6% of chlorine.

An adhesive mixture was made by adding 75 grams of Component A, together with the whole solution of Component B and 5 grams of a rubber composition containing 40 parts rubber and 60 parts of carbon black, to a sufficient quantity of xylene to give a concentration of 20% solids. This mixture gave good adhesion of rubber to metal.

Example II demonstrates how the partially decomposed chlorinated rubber may be prepared by heating a chlorinated rubber solution.

EXAMPLE II

Component A

This component, a partially decomposed chlorinated natural rubber, was prepared as follows:

50 grams of chlorinated rubber (65% chlorine), 100 grams of xylene, 4 grams of dibutyl phthalate, 20 grams of carbon tetrachloride, and 26 grams of dipentene were stirred together until the chlorinated rubber dissolved. The solution was then heated at 95° centigrade for 2 hours. Analysis of the final product revealed that it contained about 61% chlorine.

Component B

Component B of this example, a partially chlorinated natural rubber, was prepared as in Example I.

An adhesive cement was made by mixing 80 parts of the solution obtained in the preparation of Component A, 4 parts of Component B, and 1 part of a rubber composition containing 40 parts rubber and 60 parts of carbon black with sufficient additional xylene to give a concentration of 20% total solids. This adhesive cement was found to give excellent adhesion of carbon black tread-type rubber compositions and plain gum rubber compositions to blasted steel. For example, the following gum rubber composition was adhered to steel:

| Ingredients: | Parts by weight |
|---|---|
| Crepe rubber | 89.25 |
| Sulphur | 2.00 |
| Phenyl β naphthylamine | 1.00 |
| Zinc oxide masterbatch (20% rubber) | 1.25 |
| Tetramethyl thiuram disulfide masterbatch (95% rubber) | 6.00 |
| Rosin oil | 0.50 |

Cure: 30 min. @ 260° F. in a conventional press.

The partially decomposed chlorinated rubber may also be prepared by hot-milling the solid chlorinated rubber on a rubber roll-mill.

EXAMPLE III

Component A

This component, a partially decomposed chlorinated natural rubber, was prepared as follows:

100 grams of chlorinated rubber (65% chlorine) were plasticized with 40 grams of diethylene glycol butyl ether acetate, and 10 grams of carbon black were added on the mill rolls at 260° F. The mass was milled for 10 minutes. Analysis of the mixture revealed that the rubber derivative contained about 60% chlorine.

Component B

Component B of this example, a partially chorinated natural rubber, was prepared as in Example I.

An adhesive cement was made by mixing 20 parts of Component A and 5 parts of Component B with enough xylene to produce a concentration of 20% total solids. This adhesive was found to be particularly useful for adhering carbon black tire tread compositions to steel, as for example, the following synthetic rubber composition:

| Ingredients: | Parts by weight |
|---|---|
| GRS-3 (butadiene-1,3-styrene) | 200.0 |
| Benzothiazyl-2 cyclohexyl sulfenamide) | 2.0 |
| Diphenyl guanidine | 0.3 |
| Sulfur | 4.0 |
| Reinforcing carbon black | 123.0 |
| Softener | 10.0 |
| Zinc oxide masterbatch (20% rubber) | 6.0 |
| Phenyl β naphthylamine | 2.0 |

Cure: 30 min. @ 292° F. in a conventional curing press.

It was found that other halogenated rubbers such as the brominated natural and synthetic rubbers could be used in the method of this invention. For example, an adhesive containing a partially brominated derivative of natural rubber was made as follows:

EXAMPLE IV

Component A

This component, a partially decomposed chlorinated natural rubber, was prepared as was the Component A of Example III.

Component B

Component B of this example, a partially brominated natural rubber, was prepared as follows:

3 grams of bromine were added with stirring to 100 grams of a rubber solution containing 10.2 grams of rubber at a temperature of about 25° C. The brominated rubber was found to contain about 10% bromine.

An adhesive cement was prepared by adding 20 parts of Component A and 3 parts of Component B to 2 parts of a solution formed by milling 50 grams of carbon black into 50 grams of pale crepe rubber and dissolving 10 grams of the mixture in 90 grams of tolulene. The product gave good adhesion of pure gum rubber and carbon black tread compounds to blasted steel. For example, the following tire tread type composition was firmly adhered to blasted steel:

| Ingredients: | Parts by weight |
| --- | --- |
| Smoked sheet | 200.0 |
| Mercapto benzothiazole | 0.6 |
| Benzothiazyl-2 disulfide | 1.2 |
| Di-ortho-tolyl guanidine | 0.2 |
| Sulfur | 4.0 |
| Carbon black | 112.0 |
| Softener | 10.0 |
| Zinc oxide masterbatch (20% rubber) | 6.0 |
| Phenyl β naphthylamine | 3.0 |

Cure: 30 min. @ 292° F. in a conventional curing press.

Examples V through IX disclose how synthetic derivatives may be substituted for both the partially decomposed chlorinated rubbers and the partially halogenated rubbers.

EXAMPLE V

Component A

This component, a partially decomposed chlorinated natural rubber, was prepared as was Component A of Example III.

Component B

This component, a partially chlorinated polymer comprising 50 parts butadiene-1,3 and 50 parts styrene, was prepared with substantially the same procedure as in Example I. Analysis of a portion of the product revealed that it contained 8% chlorine.

An adhesive composition was made by adding 4 parts of Component A, 1 part of Component B, and 1 part of a rubber composition containing 40 parts of crude GRS-3 (75 butadiene-1,3–25 styrene) and 60 parts carbon black to enough xylene and benzene to make a cement of 15 to 20% total solids. The mixture was particularly useful in adhering compositions of butadiene-styrene polymers to steel.

EXAMPLE VI

Component A

This component was a partially decomposed chlorinated polychloroprene (neoprene) and was partially decomposed by milling on a rubber-mill for 5 minutes at 260° F. The original chlorinated neoprene contained about 70% chlorine while the partially decomposed chlorinated neoprene contained about 64 to 65% chlorine.

Component B

This component, a partially chlorinated neoprene, was prepared as was the Component B of Example I. The original neoprene contained about 38% chlorine while the partially chlorinated neoprene contained about 46% chlorine.

An adhesive cement was made by mixing 26 grams of Component A, 5 grams of Component B 2.5 grams of a GRS-3 composition containing 100 parts of GRS-3 and 40 parts of carbon black, 87 grams of xylene, 5 grams of diethylene glycol butyl ether acetate, and 8 grams of acetone. The mixture gave very good adhesion of neoprene compounds to steel and was useful for adhering GRS-3 tread type compounds to steel.

EXAMPLE VII

Component A

This component, a partially decomposed chlorinated natural rubber, was prepared as follows:

100 grams of chlorinated rubber (65% chlorine) were plasticized with 40 grams of diethylene glycol butyl ether acetate, and 10 grams of carbon black were added on the mill-rolls at 260° F. The mass was milled for 10 minutes. Analysis of the mixture revealed that the partially decomposed chlorinated rubber contained about 60% chlorine.

Component B

This component, a partially chlorinated neoprene, was prepared as was the Component B of Example I. The original crude neoprene contained about 38% chlorine and the final derivative contained about 46% chlorine.

An adhesive was made according to the recipe and procedure of Example VI except the crude rubber was natural crepe rubber. This adhesive gave excellent adhesion of neoprene to blasted steel and in addition was useful in adhering natural rubber and GRS-3 compositions to steel.

EXAMPLE VIII

Component A

This component, a partially decomposed natural rubber, was prepared as follows:

500 grams of chlorinated rubber (65% chlorine) were dissolved in 2500 g. (2850 c. c.) of benzene. Anhydrous ammonia in gaseous form was passed into this solution for approximately 4 hours at a temperature of 25° centigrade. This solution was then heated to about 75–80° C. to expel excess ammonia. The reaction product was precipitated from solution by pouring the reaction mixture into an excess of alcohol. Upon analysis, the product was found to contain approximately 59% of chlorine.

Component B

This component was a partially chlorinated polyisoprene prepared as was the Component B of Example I.

An adhesive cement was made by the method of Example VII and found to be a good rubber to metal adhesive for adhering natural and synthetic rubber compositions to steel.

EXAMPLE IX

Component A 100 grams of a partially decomposed chlorinated polymer comprising 50 parts butadiene-1,3 and 50 parts styrene, the fully chlorinated rubber containing 58% chlorine, was plasticized with 30 grams of diethylene glycol butyl ether acetate and 10 grams of carbon black were added on the mill-rolls. The mass was milled for 5 minutes at 260° F.

Component B

Component B of this example was a partially chlorinated natural rubber and was prepared as follows:

A solution consisting of 4.8 grams of sulfuryl chloride and 0.2 gram of benzoyl peroxide dissolved in 100 grams of carbon tetrachloride was added with stirring and refluxing to 200 grams of a 6% solution of pale crepe rubber in carbon tetrachloride, the reaction vessel being covered to give almost complete darkness. Analysis of a portion of the product showed that it contained 10.6% of chlorine.

An adhesive cement was prepared by mixing 26 grams of Component A, 5 grams of Component B and 3.5 grams of a rubber composition containing 40 parts of rubber and 60 parts of carbon black with 70 grams of xylene, 3 grams of diethylene glycol butyl ether acetate, and 3 grams of acetone. The mixture was a good rubber to metal adhesive for adhering butadiene-styrene synthetic rubber compositions to blasted steel.

The partially decomposed chlorinated rubber (Component A herein) may contain various amounts of chlorine. A fully chlorinated rubber containing 65% or more chlorine does not produce an adhesive exhibiting good adhesion to metal and similar surfaces. However, when a small proportion of chlorine perhaps ½, 1, 1½ or 2 percent or more is removed from the fully chlorinated rubber, the property of rubber to metal adhesion is observed. Excellent rubber to metal adhesion is obtained by the use of adhesives containing partially decomposed chlorinated rubber of progressively lower chlorine content, but when the chlorine content of the partially decomposed chlorinated rubber reaches or goes below 50 to 55%, gelling of the solution is apt to take place, it then being of less value in an adhesive composition of this invention, which must be of a freely spreadable consistency. It will be appreciated that the chlorine content at which gelling is apt to occur is not a sharp or definite point but is rather indefinite and dependent upon several variables which are not yet fully understood. The chlorine range of 50–55% is a region of instability. For instance, a partially decomposed chlorinated rubber derivative may be prepared with 50–55% chlorine and no difficulty with gelling observed, but when compounded into the adhesive of this invention, gelling is apt to occur upon standing.

The partially chlorinated rubbers (Component B herein) may contain various amounts of chlorine. A partially chlorinated rubber containing 2 to 3% chlorine is nearly rubberlike in appearance and properties and will not appreciably increase the adhesiveness of the cement of this invention, but as the chlorine content increases to 5, 7, 9, 12 and even 15% chlorine, the property of rubber to metal adhesion is observed. A partially chlorinated rubber containing more than 15% chlorine does not appreciably increase the rubber to metal adhesion of a cement of this invention. It is believed that such derivatives are too hard and brittle to give strong adhesion to such hard smooth surfaces.

The two rubber derivatives described above may be made of any rubbery material possessing, when unvulcanized, a structure made up of predominantly linear, long carbon chains comprising a multiplicity of intra-chain carbon to carbon double bonds. These rubbery materials are of the type capable of being reacted with chlorine to form the corresponding derivatives. Such materials include but are not limited to the following rubbery polymers of open-chain conjugated dienes: natural rubber (hevea), gutta percha, balata, guayule, polyisoprene, neoprene (polychloroprene), polybutadiene, polypiperylene, butadiene-1,3-acrylonitrile copolymers, GRS and other butadiene-1,3-styrene copolymers, and in addition other polymers of butadiene-1,3 and its homologs with materials copolymerizable therewith such as acrylonitrile, styrene, methyl methacrylate, methyl acrylonitrile, methyl acrylate, and other copolymerizable monomeric materials.

The adhesive cement of this invention may contain a small proportion of a crude rubber, either natural of synthetic, including any of the materials enumerated just above and in addition such rubberlike materials which ordinarily do not form chlorinated derivatives such as polyisobutylene and the like. The crude rubber appears to function as a plasticizer for the rubber derivatives and is thought to increase the adhesion of the cement layer to the superposed layer of rubber compound. The proportion of the crude rubber will depend somewhat on the amount and composition of Component B as will be discussed below.

The proportions of Component A (partially decomposed chlorinated rubber) and Component B (partially halogenated rubber) may vary somewhat, the proportions of four parts of Component A to 1 part of Component B being found to give highly satisfactory results, though proportions as low as 3 to 1 and as high as 6 to 1 have been used with success. The proportions of Components A and B may be varied with the addition of varying proportions of a crude rubber and other compounding ingredients. For example, if proportions of Component A to Component B are as much as 6 to 1, sufficient crude rubber may be used so that the proportion of Component A to the sum of Component B and crude rubber is substantially 4 to 1. I have found that with partially chlorinated rubber derivatives of low chlorine contents, for example approximately 5 to 7% chlorine, it is not essential to add a crude rubber. It will be appreciated, however, that it is to be desired to use, if possible, a Component B having at least 10 to 12% chlorine (necessitating the admixture of crude rubber) for in this manner the use of Component B is decreased, thereby reducing the cost of the adhesive.

The compounding ingredients that may be used are carbon black, coloring pigments and other coloring and reinforcing materials, age-resistors, and others known to the compounding art. Carbon black, of the reinforcing types, may be used in wide proportions. An organic age-resistor is a desirable ingredient if long service of the composite article is desired, but only small proportions of these compounds need be used. The age-resisting compounds which may be used are phenyl-β naphthylamine, phenyl-α naphthylamine, diphenyl para phenylene diamine and the like or mixtures of the above age-resistors or of any other age-resisting compound known to the art.

The solvents which may be used in the adhesive cements of this invention are any of the solvents for the crude rubberlike materials and for the two principal chlorinated rubbers of this invention, such as benzene, toluene, xylene, cymene, chloroform, carbon tetrachloride and the like as well as mixtures of one or more of the above with small amounts of one or more of the following: acetone, ketones, esters such as butyl acetate and the like, alcohols such as methyl and ethyl alcohol, and gasoline.

It will be seen that by the invention a more simple, reliable and economical method of rubber to metal adhesion has been obtained; that a composite article comprising rubber and a rigid base can be made cheaply and with the use of ordinary apparatus; and that the rubber and base can be more firmly and tenaciously bonded together. The method of the invention reduces the number of manufacturing steps and further simplifies rubber to metal adhesion by producing equally satisfactory results when applied to a variety of rubberlike materials both natural and synthetic.

Although especially valuable for adhering rubber to metal, for which the partially decomposed chlorinated rubbers and the partially chlorinated rubbers have special affinity, the present invention also will be found useful in adhering rubbers to other rigid base members such as wood, hard molded rubbers and resins, glass and the like.

While there has been disclosed with considerable detail certain preferred manners of performing this invention, it is not intended or desired to be solely limited thereto, for as hitherto stated, the procedure may be modified, the precise proportions of the materials utilized may be varied, and other materials having equivalent properties may be employed if desired without departing from the spirit and scope of the invention as defined in the appended claims.

I claim:

1. The method of adhering a vulcanizable rubber to a rigid base member comprising coating said member with at least one coat of an adhesive composition comprising from 3 to 6 parts by weight of a partially dechlorinated rubber chloride containing from 50 to 65% chlorine and made by removing chlorine from a fully chlorinated rubber, said fully chlorinated rubber being made by chlorination of an unvulcanized rubbery polymer of an open-chain conjugated diene having a structure made up of predominantly linear, long carbon chains comprising a multiplicity of intra-chain carbon to carbon double bonds and one part by weight of a partially halogenated rubber made by halogenating an unvulcanized rubber polymer of an open-chain conjugated diene to introduce therein from 3 to 15% by weight of halogen, said last-mentioned rubbery polymer having a structure made up of predominantly linear, long carbon chains comprising a multiplicity of intra-chain carbon to carbon double bonds, placing a layer of a vulcanizable rubber over said adhesive-coated member, and vulcanizing the so-formed assembly.

2. The method of adhering a vulcanizable rubber composition to a rigid base member comprising applying to said member at least one coating of an adhesive cement comprising a solution in a volatile solvent of from 3 to 6 parts by weight of a partially dechlorinated rubber chloride containing from 55 to 64.5% chlorine and made by removing chlorine from a fully chlorinated rubber, said fully chlorinated rubber being made by chlorination of unvulcanized natural rubber, one part by weight of a partially halogenated rubber containing from 3 to 15% by weight of chlorine made by chlorination of unvulcanized natural rubber, placing a layer of a vulcanizable rubber composition over said cement-coated member, and vulcanizing the so-formed assembly.

3. The method of adhering a vulcanizable rubber composition to a rigid base member which comprises applying to said member at least one coat of an adhesive cement comprising a solution in a volatile solvent of from 3 to 6 parts by weight of a partially dechlorinated rubber chloride containing from 55 to 64.5% chlorine and made by removing chlorine from a fully chlorinated rubber, said fully chlorinated rubber being made by chlorination of a rubbery copolymer of butadiene-1,3 and styrene, one part by weight of a partially chlorinated rubber containing from 3 to 15% chlorine and made by chlorination of an unvulcanized natural rubber, applying a layer of a vulcanizable rubber composition over said cement-coated member, and vulcanizing the so-formed assembly.

4. The method of adhering a vulcanizable rubber composition to a rigid base member comprising applying to said surface at least one coating of an adhesive cement comprising a solution in a volatile solvent of from 3 to 6 parts by weight of a partially dechlorinated rubber chloride containing from 55 to 65.0% chlorine and made by removing chlorine from a fully chlorinated polychloroprene, one part by weight of a partially chlorinated rubbery polychloroprene and made by chlorination of an unvulcanized rubbery polychloroprene to introduce from 3 to 15% by weight of chlorine therein, applying a layer of a vulcanizable rubber composition to said cement-covered member, and vulcanizing the so-formed assembly.

5. The method of adhering a vulcanizable rubber composition to a steel surface which comprises coating said steel surface with at least one coat of an adhesive comprising a solution in a volatile solvent of from 3 to 6 parts by weight of a partially dechlorinated rubber chloride containing from 55 to 64.5% chlorine and made by removing chlorine from a fully chlorinated natural rubber, one part by weight of a partially chlorinated rubber containing from 3 to 15% chlorine and made by chlorination of an unvulcanized natural rubber, a sufficient quantity of crude natural rubber to yield a composition in which the ratio of the weight of said partially dechlorinated rubber chloride to the sum of the weights of partially chlorinated rubber and crude rubber is substantially four to one, and an organic age-resistor, applying a layer of a vulcanizable rubber composition to said cement covered steel surface, and vulcanizing the so-formed assembly.

6. An adhesive composition comprising from 3 to 6 parts by weight of a partially dechlorinated rubber chloride containing from 50 to 65% chlorine and made by removing chlorine from a fully chlorinated rubber, said fully chlorinated rubber containing from 65 to 70% chlorine and made by reaction of chlorine with an unvulcanized rubbery polymer of an open-chain conjugated diene having a structure made up of predominantly linear long carbon chains comprising a multiplicity of intra-chain carbon to carbon double bonds and one part by weight of a partially halogenated rubber made by adding halogen atoms to the double bonds of an unvulcanized rubbery polymer of an open-chain conjugated diene to introduce from 3 to 15% halogen therein.

7. An adhesive cement comprising from 3 to 6 parts by weight of a partially dechlorinated rubber chloride containing from 55 to 64.5% chlorine and made by removing chlorine from a fully chlorinated rubber, said fully chlorinated rubber being made by chlorination of unvulcanized natural rubber, one part by weight of a partially chlorinated rubber containing from 3 to 15% chlorine and made by chlorination of natural rubber, and a volatile solvent for said rubbers.

8. An adhesive cement comprising from 3 to 6 parts by weight of a partially dechlorinated rubber chloride containing from 55 to 64.5% chlorine and made by removing chlorine from a fully chlorinated rubber, said fully chlorinated rubber being made by chlorination of an unvulcanized rubbery copolymer of butadiene-1,3 and styrene, one part of a partially chlorinated rubber containing from 3 to 15% chlorine and made by chlorination of an unvulcanized natural rubber, and a volatile solvent for said rubbers.

9. An adhesive cement comprising from 3 to 6 parts by weight of a partially dechlorinated rubber chloride containing from 55 to 64.5% chlorine by weight and made by removing chlorine from a fully chlorinated natural rubber, one part by weight of a partially chlorinated rubber containing from 3 to 15% chlorine and made by chlorination of unvulcanized natural rubber, a sufficient quantity of crude natural rubber to yield a composition in which the ratio of the weight of said partially dechlorinated rubber chloride to the sum of the weights of the partially chlorinated rubber and crude rubber is substantially four to one, an organic age-resistor, and a volatile solvent for said rubbers.

10. A composite product comprising a rigid base member, a layer of vulcanized rubber and an intervening bonding layer comprising from 3 to 6 parts by weight of a partially dechlorinated rubber chloride containing from 50 to 65% chlorine and made by removing chlorine from a fully chlorinated rubber, said fully chlorinated rubber being made by chlorination of an unvulcanized rubbery polymer of an open-chain conjugated diene having a structure made up of predominantly linear, long carbon chains comprising a multiplicity of intra-chain carbon to carbon double bonds and one part by weight of a partially halogenated rubber made by chlorinating an unvulcanized rubbery polymer of an open-chain conjugated diene having a structure made up of predominantly linear, long carbon chains comprising a multiplicity of carbon to carbon double bonds.

11. A composite product comprising a rigid base member, a layer of vulcanized rubber and an intermediate bonding layer comprising from 3 to 6 parts by weight of a partially dechlorinated rubber chloride containing from 55 to 64.5% chlorine and made by removing chlorine from a fully chlorinated rubber, said fully chlorinated rubber being made by chlorination of unvulcanized natural rubber, and one part by weight of a partially chlorinated rubber containing from 3 to 15% chlorine and made by chlorinating unvulcanized natural rubber.

12. A composite product comprising a rigid base member, a layer of vulcanized rubber and an intermediate bonding layer comprising from 3 to 6 parts by weight of a partially dechlorinated rubber chloride containing from 55 to 65.0% chlorine and made by removing chlorine from a fully chlorinated rubber, said fully chlorinated rubber being made by chlorination of polychloroprene, and one part by weight of a partially chlorinated rubbery polychloroprene made by chlorinating unvulcanized rubbery polychloroprene to introduce from 3 to 15% chlorine therein.

13. A composite product comprising a rigid base member, a layer of vulcanized rubber and an intermediate bonding layer comprising from 3 to 6 parts by weight of a partially dechlorinated rubber chloride containing from 55 to 64.5% chlorine and made by removing chlorine from a fully chlorinated rubber copolymer of butadiene-1,3 and styrene and one part by weight of a partially chlorinated rubber containing from 3 to 15% chlorine and made by chlorinating an unvulcanized natural rubber.

14. A composite product comprising a rigid base member, a layer of vulcanized rubber and an intermediate bonding layer comprising from 3 to 6 parts of a partially dechlorinated rubber chloride containing from 55 to 64.5% chlorine and made by removing chlorine from a fully chlorinated natural rubber, one part by weight of a partially chlorinated rubber containing from 3 to 15% chlorine and made by chlorinating unvulcanized natural rubber, a sufficient quantity of a crude rubber to yield a composition in which the ratio of the weight of said dechlorinated rubber chloride to the combined weights of said partially chlorinated rubber and crude rubber is substantially four to one, and an organic age resistor.

15. An adhesive cement comprising from three to six parts by weight of a partially dechlorinated rubber chloride containing from 55 to 65% chlorine and made by removing chlorine from a fully chlorinated rubber, said fully chlorinated rubber being made by chlorination of unvulcanized natural rubber, one part by weight of a partially chlorinated rubbery polychloroprene made by chlorination of unvulcanized rubbery polychloroprene to introduce from 3 to 15% by weight of chlorine therein, and a volatile solvent for said rubbers.

16. An adhesive cement comprising from three to six parts by weight of a partially dechlorinated rubbery polychloroprene containing from 55 to 65% by weight of chlorine and made by removing chlorine from a fully chlorinated rubbery polychloroprene, one part by weight of a partially chlorinated rubbery polychloroprene made by chlorination of unvulcanized rubbery polychloroprene to introduce from 3 to 15% by weight of chlorine therein, and a volatile solvent for said rubbers.

17. An adhesive cement comprising from three to six parts by weight of a partially dechlorinated rubber chloride containing from 55 to 65% by weight of chlorine and made by removing chlorine from a fully chlorinated rubber, said fully chlorinated rubber being made by chlorination of an unvulcanized natural rubber, one part by weight of a partially chlorinated rubber made by chlorination of an unvulcanized rubbery copolymer of butadiene-1,3 and styrene to introduce from 3 to 15% by weight of chlorine therein, and a volatile solvent for said rubbers.

JAMES R. SCHAFFER.

(References on following page)

REFERENCES CITED

The following references are of record in the file of this patent:

UNITED STATES PATENTS

| Number | Name | Date |
|---|---|---|
| 2,148,831 | Raynolds | Feb. 28, 1939 |
| 2,149,926 | Moore | Mar. 7, 1939 |
| 2,170,947 | Habgood et al. | Aug. 29, 1939 |
| 2,259,190 | Winkelmann | Oct. 14, 1941 |

FOREIGN PATENTS

| Number | Country | Date |
|---|---|---|
| 544,138 | Great Britain | Mar. 30, 1942 |